(12) United States Patent
Sakamoto

(10) Patent No.: US 12,373,148 B2
(45) Date of Patent: Jul. 29, 2025

(54) PRINTING APPARATUS FOR DETERMINING JOB PRIORITY BASED ON INSTALLED ROLL MEDIA, CONTROL METHOD OF PRINTING APPARATUS, AND STORAGE MEDIUM

(71) Applicant: CANON KABUSHIKI KAISHA, Tokyo (JP)

(72) Inventor: Mitsuaki Sakamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/534,838

(22) Filed: Dec. 11, 2023

(65) Prior Publication Data

US 2024/0201915 A1 Jun. 20, 2024

(30) Foreign Application Priority Data

Dec. 19, 2022 (JP) .................................. 2022-202227

(51) Int. Cl.
*G06F 3/12* (2006.01)

(52) U.S. Cl.
CPC ............ *G06F 3/1263* (2013.01); *G06F 3/121* (2013.01); *G06F 3/1251* (2013.01); *G06F 3/1275* (2013.01)

(58) Field of Classification Search
CPC .... G06F 3/1263; G06F 3/1251; G06F 3/1275; G06F 3/1262
See application file for complete search history.

(56) References Cited

U.S. PATENT DOCUMENTS

| | | | |
|---|---|---|---|
| 2015/0379379 A1* | 12/2015 | Kubota | G06F 3/1217 358/1.15 |
| 2018/0260171 A1* | 9/2018 | Inoda | G06F 3/1219 |
| 2023/0107758 A1* | 4/2023 | Nishide | G06F 3/1251 358/1.15 |
| 2024/0143244 A1* | 5/2024 | Mitsui | G06F 3/1205 |

FOREIGN PATENT DOCUMENTS

JP 2016-007785 A 1/2016

* cited by examiner

*Primary Examiner* — Benjamin O Dulaney
(74) *Attorney, Agent, or Firm* — VENABLE LLP

(57) ABSTRACT

In a printing apparatus when a print job that can belong to the same print group as that of a first priority job is input newly during printing of the first priority job and the newly input print job is in a printable state, the newly input print job is added to the same print group as that of the first priority job, and in a case where the newly input print job is not in a printable state and a standby time until the newly input print job enters a printable state is shorter than a printing preparation time taken for exchange of the installed printing medium, the printing apparatus stands by until the newly input print job enters a printable state and adds the newly input print job to the same print group as that of the first priority job.

12 Claims, 15 Drawing Sheets

FIG.4

| Job ID 402 | Total number of pages 403 | Output color 404 | Paper ID 405 | Degree of priority 406 | Processing state 407 | Print group ID 408 |
|---|---|---|---|---|---|---|
| 0001 | 1000 × 1 copy | CMYK | 1 | normal (1) | during printing | PG-1 |
| 0002 | 100 × 1 copy | CMYKW | 3 | normal (1) | RIP completed | PG-2 |
| 0003 | 50 × 10 copies | CMYKW | 3 | priority (2) | RIP completed | PG-2 |
| 0004 | 10 × 10 copies | CMYKW | 3 | priority (2) | RIP completed | PG-2 |
| 0005 | 1 × 10000 copies | CMYK | 2 | normal (1) | RIP completed | PG-3 |
| 0006 | 1 × 100 copies | CMYK | 2 | priority (2) | during RIP | |
| 0007 | 10 × 1000 copies | K | 1 | normal (1) | during standby | |
| ... | ... | ... | ... | ... | ... | ... |

(table 401)

| Paper ID | Width of paper | Type of paper | Thickness of paper |
|---|---|---|---|
| 1 | 330 mm | high-quality paper (1) | 0.3 mm |
| 2 | 300 mm | film (4) | 0.1 mm |
| 3 | 310 mm | glossy paper (2) | 0.5 mm |
| 4 | 330 mm | glossy paper (2) | 0.5 mm |
| ... | ... | ... | ... |

FIG.5A

| | Paper ID | Width of paper | Ink color | | | | |
|---|---|---|---|---|---|---|---|
| Installed | 1 | 330 mm | Cyan | Magenta | Yellow | Black | White |
| Remaining amount | 800 m | | 90 % | 90 % | 90 % | 90 % | 95 % |

| Job ID | Total number of pages | Output color | Paper ID | Degree of priority | Processing state | Print group ID |
|---|---|---|---|---|---|---|
| 0001 | 1000 × 1 copy | CMYK | 1 | normal (1) | RIP completed | PG-1 |
| 0002 | 100 × 1 copy | CMYKW | 3 | normal (1) | RIP completed | |
| 0003 | 50 × 10 copies | CMYKW | 3 | priority (2) | RIP completed | |
| ... | | | | | ... | |

619 ↗

| Print group ID | Total number of pages | Output color | Paper ID | Degree of priority | Processing state |
|---|---|---|---|---|---|
| PG-1 | 1000 | CMYK | 1 | 1 | RIP completed |
| ... | | | ... | | |

| Job ID | Total number of pages | Output color | Paper ID | Degree of priority | Processing state | Print group ID |
|---|---|---|---|---|---|---|
| 0001 | 1000 × 1 copy | CMYK | 1 | normal (1) | RIP completed | PG-1 |
| 0002 | 100 × 1 copy | CMYKW | 3 | normal (1) | RIP completed | PG-2 |
| 0003 | 50 × 10 copies | CMYKW | 3 | priority (2) | RIP completed | |
| ... | ... | ... | ... | ... | ... | ... |

619

| Print group ID | Total number of pages | Output color | Paper ID | Degree of priority | Processing state |
|---|---|---|---|---|---|
| PG-1 | 1000 | CMYK | 1 | 1 | RIP completed |
| PG-2 | 100 | CMYKW | 3 | 1 | RIP completed |
| ... | ... | ... | ... | ... | ... |

| Job ID | Total number of pages | Output color | Paper ID | Degree of priority | Processing state | Print group ID |
|---|---|---|---|---|---|---|
| | 404 | 405 | | | | 609 |
| | | | | | | 610 |
| | | | | | | 611 |
| | | | | | | 612 |
| 0001 | 1000 × 1 copy | CMYK | 1 | normal (1) | RIP completed | PG-1 |
| 0002 | 100 × 1 copy | CMYKW | 3 | normal (1) | RIP completed | PG-2 |
| 0003 | 50 × 10 copies | CMYKW | 3 | priority (2) | RIP completed | PG-2 |
| ... | ... | ... | ... | ... | ... | ... |

619

| Print group ID | Total number of pages | Output color | Paper ID | Degree of priority | Processing state |
|---|---|---|---|---|---|
| 613 | 614 | 615 | 616 | 617 | 618 |
| PG-1 | 1000 | CMYK | 1 | 1 | RIP completed |
| PG-2 | 600 | CMYKW | 3 | 3 | RIP completed |
| ... | ... | ... | ... | ... | ... |

| Rule ID | Rule | Sub-rule |
|---|---|---|
| 1 | Refer to installed paper ID | |
| 2 | Refer to registration order of paper ID | Sub-1 |
| 3 | Refer to print length | |
| 4 | Refer to degree of priority in printing | Sub-2 |
| 5 | Refer to similarity between types of paper | |
| ... | ... | ... |

| Registration order | Paper ID | Type of roll paper |
|---|---|---|
| 1 | 1 | high-quality paper |
| 2 | 2 | glossy paper |
| 3 | 4 | semi-glossy paper |
| 4 | 3 | film |
| ... | ... | ... |

| Installed \ Change destination | High-quality paper (1) | Glossy paper (2) | Film (3) |
|---|---|---|---|
| high-quality paper (1) | 1 | 0.8 | 0 |
| glossy paper (2) | 0.5 | 1 | 0 |
| film (3) | 0 | 0 | 1 |

| Application order | Rule |
|---|---|
| 1 | Refer to installed paper ID |
| 2 | Refer to registration order of paper ID |
| 3 | Refer to print length |

| Application order | Rule |
|---|---|
| 1 | Refer to installed paper ID |
| 2 | Refer to similarity between types of paper |
| 3 | Refer to print length |
| 4 | Refer to degree of priority in printing |

| Print group ID | Total number of pages | Output color | Paper ID | Degree of priority | Processing state |
|---|---|---|---|---|---|
| PG-1 | 1000 | CMYK | 1 | 1 | during printing |
| PG-2 | 600 | CMYKW | 3 | 3 | RIP completed |
| ... | | | | | |

1010, 1011, 1012

(b)

| Calibration | Registration adjustment | Head adjustment | Color matching | Density adjustment |
|---|---|---|---|---|
| OFF | ON | ON | recommended | recommended |

1013

PRINTING APPARATUS FOR DETERMINING JOB PRIORITY BASED ON INSTALLED ROLL MEDIA, CONTROL METHOD OF PRINTING APPARATUS, AND STORAGE MEDIUM

BACKGROUND

Field

The present disclosure relates to a printing apparatus performing printing for a printing medium in the form of a roll, a control method of the printing apparatus, and a storage medium.

Description of the Related Art

Conventionally, a printing apparatus performing printing for roll paper, which is a printing medium in the form of a roll, is known. In the printing apparatus using roll paper, the number of rolls that can be installed is generally one or two. Because of this, roll paper exchange is performed as appropriate in order to print a print job of a variety of settings. Further, in order to perform stable printing after roll paper exchange, printing preparations are necessary before starting printing, such as calibration and density adjustment. Because of this, depending on the order of printing, there is a case where unnecessary roll paper exchange occurs and productivity is reduced.

Japanese Patent Laid-Open No. 2016-7785 has disclosed a technique to determine a job as a first priority job, which uses roll paper with which printing can be performed immediately among rolls already installed in the printing apparatus.

SUMMARY

Note that with the technique described in Japanese Patent Laid-Open No. 2016-7785, in printing of a job that does not use any installed roll paper, it is necessary to perform roll paper exchange, and therefore, it is not possible to reduce the time for preparations. That is, for a job that does not use the installed roll paper, it is not possible to reduce the time for preparations, and therefore, productivity is reduced.

The present disclosure has been made in view of the problem such as this and an object thereof is to reduce the printing preparation time taken for printing medium exchange and improve productivity in a printing apparatus performing printing for a printing medium in the form of a roll.

The printing apparatus performing printing for a printing medium in the form of a roll according to the present disclosure includes: a determination unit configured to determine a printing-target print job; and a control unit configured to control printing for the printing medium in accordance with the print job, wherein the determination unit: determines a print job using an installed printing medium as a first priority job; and determines, during printing of the first priority job, a second priority job to be printed with priority after the first priority job among print jobs not using the installed printing medium.

Further features of the present disclosure will become apparent from the following description of exemplary embodiments with reference to the attached drawings.

BRIEF DESCRIPTION OF THE DRAWINGS

FIG. 4 is one example of a job list;

FIG. 5A and FIG. 5B are each one example of apparatus information;

FIG. 6B is one example of a job list and one example of a print group list;

FIG. 6C is one example of a job list and one example of a print group list;

FIG. 6D is one example of a job list and one example of a print group list;

FIG. 7A to FIG. 7E are one example of printing-target job determination conditions;

FIG. 10B is one example of a print group list and one example of a printing procedure list.

DESCRIPTION OF THE EMBODIMENTS

Figure 1:
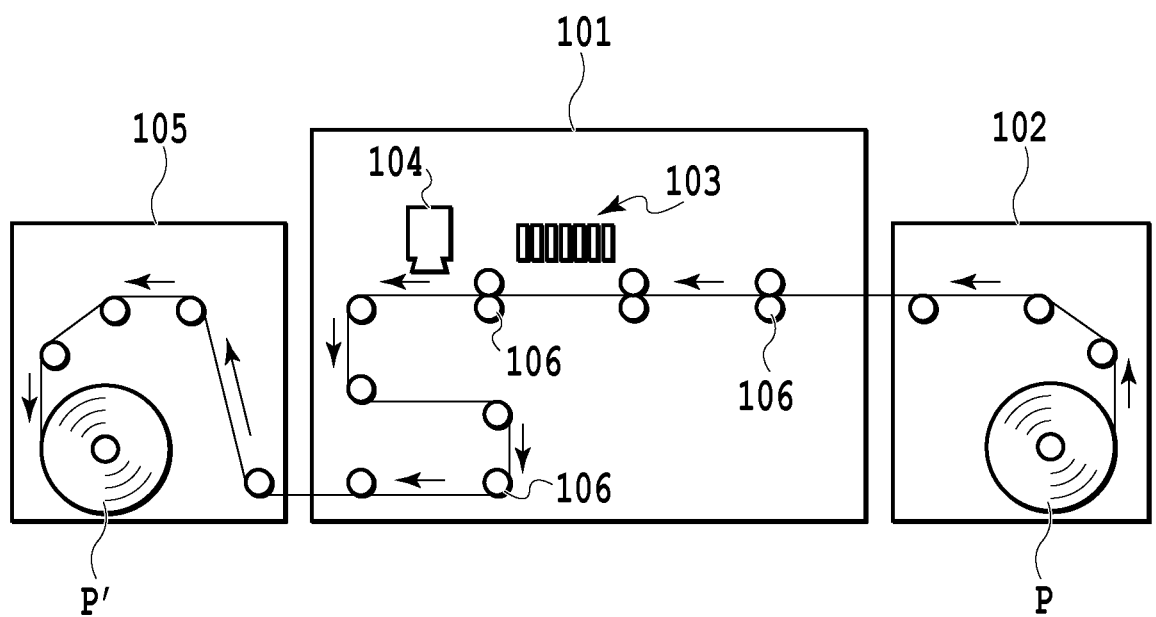
FIG. 1 is a configuration diagram of a whole printing system including a printing apparatus.

In the following, with reference to the attached drawings, embodiments are explained in detail. The following embodiments are not intended to limit the present invention according to the claims. In the embodiments, though a plurality of features is described, all the plurality of features is not necessarily indispensable to the present invention and the plurality of features may be combined arbitrarily. Further, in the attached drawings, to the same or similar configuration, the same reference numeral is attached and duplicated explanation is omitted.

First Embodiment

FIG. 1 is a diagram schematically showing a printing system configuration including a printing apparatus 101 according to one embodiment of the present disclosure. The printing apparatus 101 is an ink jet printer forming a printed material P' by ejecting ink to a printing medium P from a printing unit 103. The printing medium P is supplied to the printing apparatus 101 by a paper feed unit 102 and after the printed material P' is formed in the printing apparatus 101, the printed material P' is collected by a paper discharge unit 105. The printing medium P passes over a conveyance path by a roller 106. The printing apparatus 101 inspects the image obtained by a printed image obtaining unit 104 for the printed material. "Printing" widely includes forming an image, pattern, and the like on a printing medium irrespective of having or not having significance, in addition to forming significant information, such as a character, graphic and the like. Further, "printing" also includes modifying a medium irrespective of whether or not visualization is performed so as to enable visual perception by a human being. Furthermore, in the present embodiment, though paper in the form of a roll is supposed as "printing medium", cloth, plastic, film and the like may be acceptable. Though the component of ink is not limited particularly, in the present embodiment, a case is supposed where a water pigment ink including pigment, which is a color material, water, and resin is used.

Figure 2:
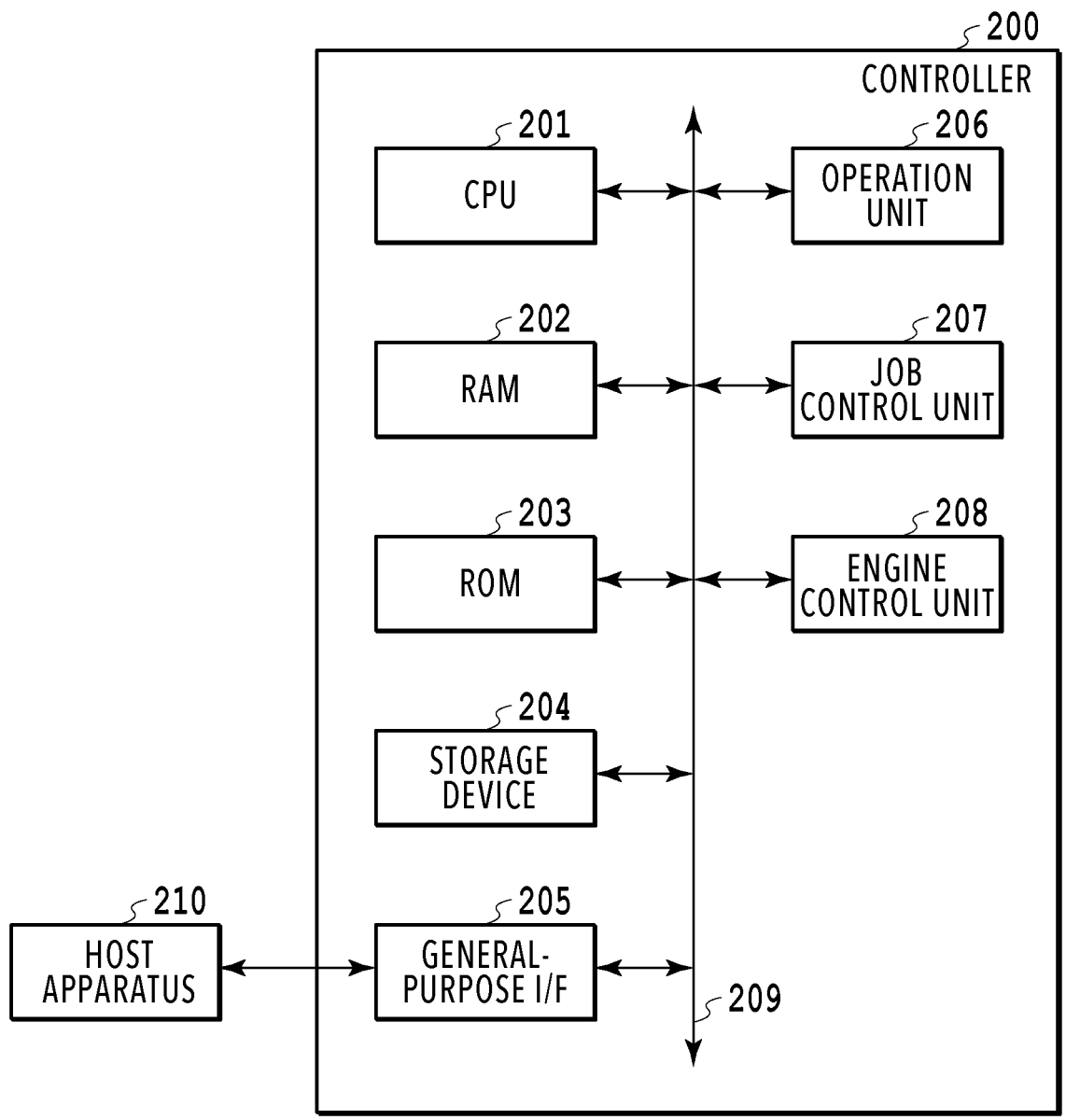
FIG. 2 is a block diagram of a controller in the printing apparatus.

FIG. 2 is a block diagram of a controller 200 in the printing apparatus 101. The controller 200 has a CPU 201, a RAM 202, a ROM 203, a storage device 204, and a general-purpose interface (I/F) 205. Further, the controller 200 has an operation unit 206, a job control unit 207, and an engine control unit 208. The devices within the controller are connected via a main bus 209. A host apparatus 210 is connected with the controller 200 via the general-purpose I/F 205. The CPU 201 is a processor comprehensively controlling each unit within the printing apparatus 101. The RAM 202 functions as a main memory, a work area and the like of the CPU 201. The ROM 203 stores a program group executed by the CPU 201. The storage device 204 stores applications executed by the CPU 201, job information used for printing, image data and the like. The general-purpose I/F 205 is a USB and LAN and receives an input or the like of job data via the host apparatus 210. The operation unit 206 includes a liquid crystal display or the like and displays to a user and informs a user of the current situation and setting. Further, the operation unit 206 receives instructions to resume printing and the like from a user. The job control unit 207 performs control relating to printing, such as the analysis of a job and the determination of a printing order. The engine control unit 208 performs control for the printing unit 103. The host apparatus 210 prepares image data and the like necessary for a print job processed by the printing apparatus 101.

Figure 3:
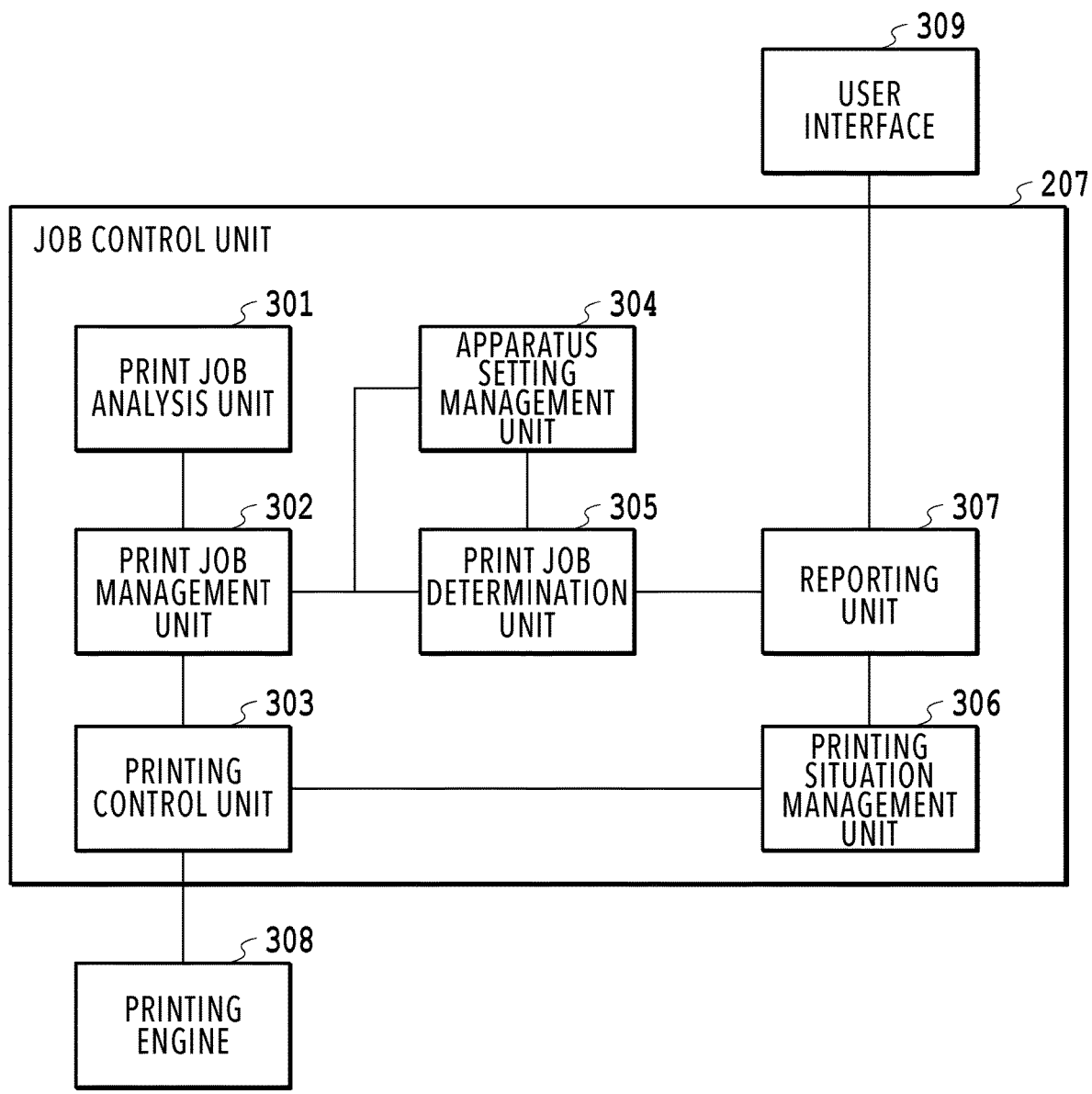
FIG. 3 is a block diagram showing a function configuration of the printing apparatus.

FIG. 3 is a block diagram showing the function configuration of the job control unit 207 in the printing apparatus 101. The job control unit 207 has a print job analysis unit 301, a print job management unit 302, a printing control unit 303, an apparatus setting management unit 304, and a print job determination unit 305. Further, the job control unit 207 has a printing situation management unit 306 configured to manage the printing situation via the printing control unit 303 and a reporting unit 307 configured to report the information on the job control unit 207 to a user interface 309 of the operation unit 206.

The print job analysis unit 301 analyzes the job received by the job control unit 207 and obtains job information, such as information on the number of copies to be printed and the printing paper. The print job management unit 302 manages the job information obtained by the print job analysis unit 301. The printing control unit 303 determines the printing order and makes a printing request to a printing engine 308. Further, the printing control unit 303 reports the printing completion notice from the printing engine 308 to the printing situation management unit 306.

The apparatus setting management unit 304 manages the state of the printing apparatus 101, such as the installed paper and ink. Further, the apparatus setting management unit 304 also stores the procedure that is performed after roll paper exchange and the execution time of each procedure, such as calibration. The print job determination unit 305 determines a first priority job and a second priority job from within the jobs managed by the print job management unit 302 by utilizing information of the apparatus setting management unit 304. The determined target jobs are reported to the printing control unit 303 via the print job management unit 302. Further, the print job determination unit 305 reports the execution procedure and the like of the second priority job to the reporting unit 307. The printing situation management unit 306 communicates with the printing control unit 303 and manages the progress of printing and the like. The reporting unit 307 reports the information reported from the print job determination unit 305 and the printing situation management unit 306 to the user interface 309.

FIG. 4 shows one example of job information stored by the print job management unit 302 in the present embodiment. The job information is stored in the format of a job list 401.

The job list 401 includes information on each job obtained by the print job analysis unit 301. Job ID 402 is a job identifier that is issued each time a print job is input to the job control unit 207. Total number of pages 403 is information indicating the total number of pages to be printed, which is the product of the number of pages within job data and the number of copies to be printed. Output color 404 is information indicating the ink color, such as CMYK, which is used in printing the job. Paper ID 405 is an identifier for identifying the paper that is used in printing. The ink color and the paper information are information that is managed by the apparatus setting management unit 304 and will be explained in FIG. 5, to be described later. Degree of priority 406 is information indicating the degree of priority in printing. Total number of pages 403, Output color 404, Paper ID 405, and Degree of priority 406 are each information that is obtained by analyzing an input job. Processing state 407 is information indicating the processing state of a job. To the input job, a state is set, such as "during standby", "during RIP", "RIP completed, and "during printing". For example, the state of a job whose printing starts in the printing engine 308 is set to "during printing". Print group ID 408 is a management group identifier for performing continuous printing. The print jobs in the same group are printed en bloc. The determination method of Print group ID 408 is explained in FIG. 6, to be described later.

FIG. 5A and FIG. 5B each show one example of apparatus information that is managed by the apparatus setting management unit 304 in the present embodiment.

FIG. 5A shows one example of paper information. The paper setting registered as the printing paper of the printing apparatus 101 is managed as a paper management list 501. In the paper management list 501, as management information, Paper ID 502, Width of paper 503, Type of paper 504, and Thickness of paper 505 are stored. In a case where a new type of paper that is used in printing of the printing apparatus 101 is added, new paper ID is added to the paper management list 501. In the present embodiment, the registration of paper information is performed by a user via the user interface 309. Paper ID 502 corresponds to Paper ID 405 of each job, which is registered in the job list 401. Width of paper 503, Type of paper 504, and Thickness of paper 505 are each detailed information on the registered paper. Further, Width of paper 503 is utilized for the control of the printing unit 103. Each of Type of paper 504 and Thickness of paper 505 is utilized for the control of a roller 106 and the printing engine 308.

FIG. 5B shows one example of apparatus information that is managed as the current apparatus setting state of the printing apparatus 101. Apparatus information 506 includes information on the paper and ink that can be utilized by the current apparatus. The current state of the apparatus indicated by the apparatus information 506 is reported to a user via the user interface 309. In the present embodiment, as paper information, the information of the paper management list 501 is utilized and Paper ID 502 and Width of paper 503 are stored as installed information. Further, the paper length that can be used at present is stored as a remaining length of paper 508. As ink information, ink color 507 that the printing unit 103 can eject is stored and for each ink color, a remaining ink level 509 is stored. In the present embodiment, the remaining length of paper 508 and the remaining ink level 509 are managed in real time by the printing engine 308.

Figure 6A:
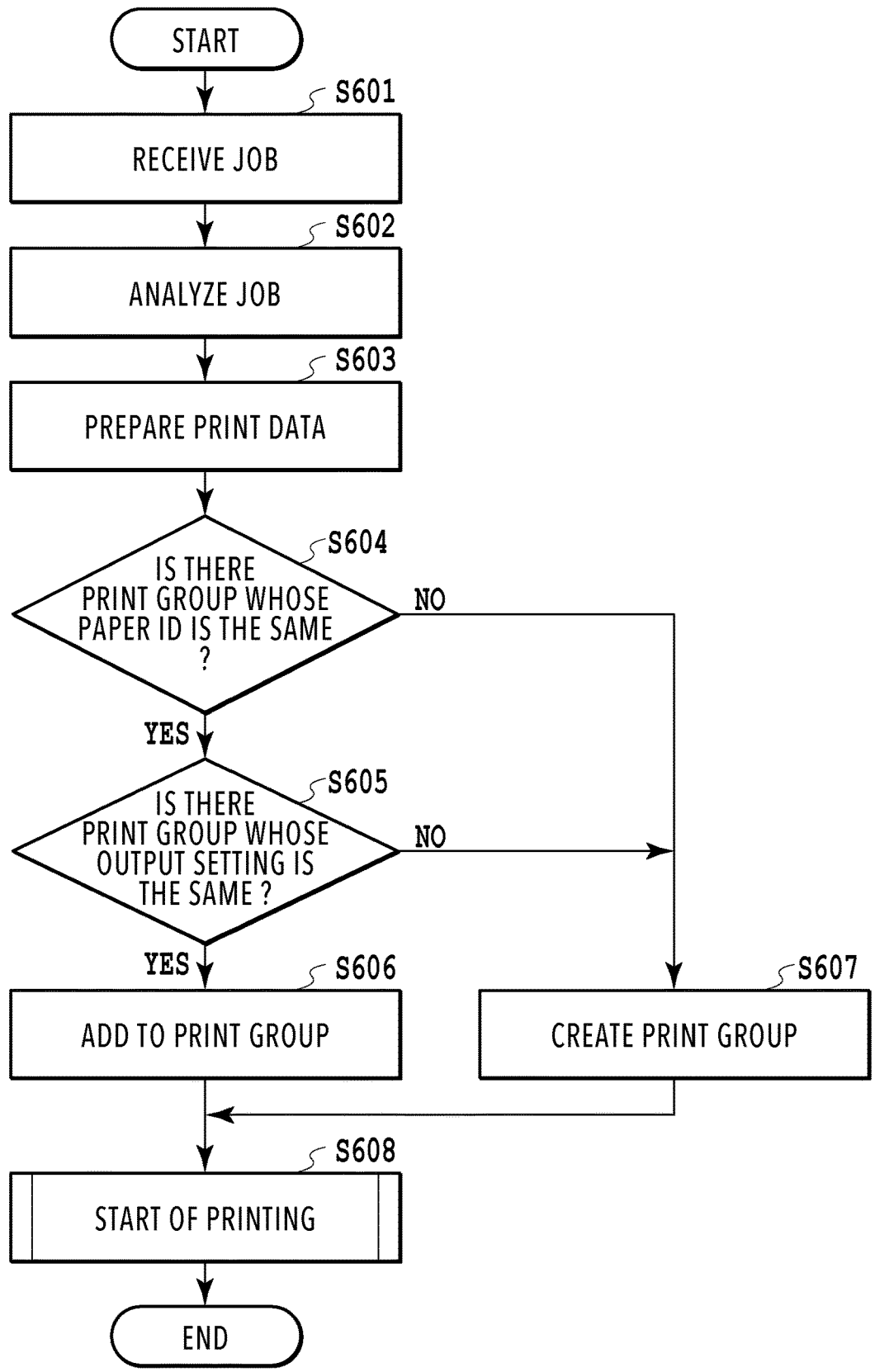
FIG. 6A is a flowchart of print processing.

Next, with reference to FIG. 6A to FIG. 6D, the print processing in the present embodiment is explained. FIG. 6A is a flowchart of the print processing in the present embodiment. By using FIG. 4, the processing in FIG. 6A is explained. The print processing is started in a case where data is input to the job control unit 207.

First, at S601, the print job analysis unit 301 receives a print job. The print job analysis unit 301 assigns unique Job ID 402 to the print job received at this time. Next, at S602, the print job analysis unit 301 analyzes the received print job. The analysis results are registered in the job list 401. Next, at S603, based on the analysis results, the print job management unit 302 performs image processing (RIP) and prepares print data for performing printing.

After the preparations of print data are completed, at S604 to S607, the print job determination unit 305 determines Print group ID 408 for performing continuous printing.

First, at S604, the print job determination unit 305 searches whether Print group ID 408 whose Paper ID 405 of the print job is the same is already registered. In a case where such Print group ID 408 is already registered (YES at S604), at S605, the output setting of the print job and that of Print group ID 408 are checked. In the present embodiment, the output setting refers to the setting of Output color 404. In a case where Output color 404 of the print job and Output Color 404 of the print group are the same (YES at S605), at S606 the print job is added to the print group. On the other hand, in a case where there is no print group whose Paper ID 405 is the same (NO at S604), or in a case where there is no print group whose Output color 404 is the same (NO at S605), at S607, new Print group ID 408 is created.

Here, with reference to FIG. 6B, FIG. 6C, and FIG. 6D, print group registration processing at S604 to S607 is explained specifically. Explanation is given on the assumption that three jobs, that is, a job 0001, a job 0002, and a job 0003, are input as the print job. FIG. 6B, FIG. 6C, and FIG. 6D each show the state of a job list 609 and the state of a print group list 619 immediately after the print group registration processing is completed for each of the job 0001, the job 0002, and the job 0003. The print group list 619 is managed by the print job determination unit 305 and created in a case where a print job is input to the job control unit 207 for the first time. The job list 609 manages the same information as that in the job list 401 explained in FIG. 4. The print group list 619 includes Print group ID 613, Total number of pages 614, Output color 615, Paper ID 616, Degree of priority 617, and Processing state 618. Print group ID 613 is a unique identifier of a print group and issued in a case where a new print group is created. Total number of pages 614, Output color 615, Paper ID 616, Degree of priority 617, and Processing state 618 are set based on the information on each job belonging to the print group. Processing state 618 is set to "RIP completed" before printing of the print group is started and after the printing starts, set to "during printing".

The job 0001 shown in FIG. 6B is registered in the print group list 619 as a new print group because another print group does not exist in a case where a print group is registered. In a case where the job 0001 is registered in the print group, a print group ID 610 whose job belongs to Print group ID 408 of the job list 609 is set. In the print group list 619, each piece of information on the job 0001 is set from the job list 609.

Next, processing to add a new print group (NO at S604) is explained by using the job 0002 in FIG. 6C.

First, at S604, the print job determination unit 305 searches whether a print group ID whose Paper ID 405 is the same is already registered by referring to the print group list 619. In this case, in the print group list 619, the print group 610 exists and Paper ID 616 of the print group 610 is "1". Paper ID 405 of the job 0002 is "3" and this is not the same as "1" of Paper ID 616 of the print group 610. Further, in the print group list 619, another print group does not exists, and therefore, it is determined that a print group whose Paper ID 405 is "3" does not exist (NO at S604). Consequently, at S607, the print job determination unit 305 creates "PG-2" of a new print group 611 as a print group to which the job 0002 belongs. The new print group 611 is created, and therefore, a new print group ID is added also to the print group list 619. In a case where a new print group ID is added to the print group list 619, Total number of pages 614, Output color 615, Paper ID 616, and Degree of priority 617 are set by using the information on the job that is referred to in a case where the print group ID is added. That is, to the new print group 611, the information on the job 0002 is set.

Next, processing to add a new job to the already existing print group (YES at S605) is explained by using the job 0003 in FIG. 6D.

For the job 003 also, first, the print job determination unit 305 searches whether a print group ID whose Paper 405 is the same is already registered in the print group list 619. In this case, in the print group list 619, two groups, that is, "PG-1" of the print group 610 using Paper ID "1" and "PG-2" of the print group 611 using Paper ID "3" exist. Paper ID 405 of the job 0003 is "3", and therefore, the print group 611 is found (YES at S604). Next, at S605, whether Output color 404 as the output setting is the same is determined. Both Output color 404 of the job 0003 and Output color 615 of the print group 611 are "CMYKW" and the same (YES at S605), and therefore, at S606, the job 0003 is added to "PG-2" of the print group 611. The job 0003 is added to "PG-2" of the print group 611, and therefore, "PG-2" is set to a print group 612 of the job 0003.

In the print group list 619, a new job is registered in "PG-2" of the print group 611, and therefore, the print job determination unit 305 updates Total number of pages 614 of the print group 611. Further, the print job determination unit 305 also updates Degree of priority 617. In the present embodiment, Total number of pages 614 and Degree of priority 617 are updated, respectively, to the sum of the belonging jobs. Total number of pages 614 is updated to "600" by "500" pages of the job 0003 being added from the job list 609. Further, Degree of priority 617 is updated to "3" by the degree of priority "2" of the job 0003 being added. In the present embodiment, the higher value of Degree of priority 617 indicates that the print group is one that should be printed with a higher priority. The degree of priority of the print group is determined by taking into consideration both the number of jobs included in the print group and the degree of priority of each job, and therefore, the sum total of the degrees of priority of the jobs within the print group is taken as the degree of priority of the print group.

In the present embodiment, though Output color 404 is utilized as one example of the output setting, it may also be possible to utilize the print mode, such as normal resolution and high resolution, and the like.

Returning to FIG. 6A, after the registration of the print group is completed, at S608, the print job determination unit 305 determines the print group to be printed based on the information of the apparatus setting management unit 304 and starts printing. The print job determination unit 305 changes the processing state of the print job and the print group taken to be the target at this time to "during printing". The print group of the print group list 619 is deleted after the printing of the print group is completed. In the present embodiment, in the printing start processing at S608, the first priority job and the second priority job are determined. Processing to determine the first priority job and the second priority job will be described later with reference to FIG. 7A to FIG. 9.

FIG. 7A to FIG. 7E show rule setting for determining the first priority job and the second priority job from among the print group, that is, one example of printing-target job determination conditions.

FIG. 7A is a diagram showing a rule list 701 that can be applied as rule setting. In the rule list 701, each Rule 703 is prepared together with Rule ID 702. Further, Sub-rule 704 necessary in a case where Rule 703 is applied is also managed. For example, for Rule ID "2", "Sub-1" is registered as Sub-rule 704 and this indicates that in a case where Rule ID "2" is applied, as "Sub-1", a paper registration order list 705 in FIG. 7B is referred to. Similarly, for Rule ID "5", "Sub-2" is registered as Sub-rule 704 and this indicates that in a case where Rule ID "5" is applied, a similarity between paper types list 706 in FIG. 7C is referred to. The paper registration order list 705 and the similarity between paper types list 706 are updated in a case where Paper ID 502 is newly added to the paper management list 501. The paper registration order list 705 may refer to the paper management list 501. In the similarity between paper types list 706, the relationship between each paper type is managed as unique information.

Each of rule settings 707 and 711 in FIG. 7D and FIG. 7E is managed by a combination of application order and rule. To the rules of the rule settings 707 and 711, Rule ID 702 or Rule 703 of the rule list 701 is set and the rules of the rule settings 707 and 711 are referred to in a case where the first priority job and the second priority job are determined in processing in FIG. 8 and FIG. 9, to be described later, in accordance with the application order.

In the rule setting 707 shown in FIG. 7D, three rules, that is, a rule 708, a rule 709, and a rule 710 are registered. The rule setting 707 includes Rule ID "1", Rule ID "2", and Rule ID "3" of the rule list 701. Further, the rule 709 of the rule setting 707 is Rule ID "2" of the rule list 701 and to Rule ID "2", the paper registration order list 705 is set as the sub-rule. Because of this, in a case where the rule setting 707 is applied, the first priority job and the second priority job are determined by referring to the rule setting 707 and the paper registration order list 705.

In the rule setting 711 shown in FIG. 7E, four rules, that is, a rule 712, a rule 713, a rule 714, and a rule 715 are registered. The rule setting 707 and the rule setting 711 are managed as separate rule settings. In the present embodiment, it is assumed that one rule setting is referred to in a case where the first priority job and the second priority job are determined in processing in FIG. 8 and FIG. 9, to be described later. The rule list 701, the rule setting 707, and the rule setting 711 shown in FIG. 7A, FIG. 7D, and FIG. 7E are managed by the print job determination unit 305.

In the present embodiment, basically in order to suppress roll paper exchange, the rule setting is prepared in advance, which preferentially applies the rule utilizing paper information, such as Rule ID "1", Rule ID "2", and Rule ID "5" of the rule list 701. As the rule setting, it may also be possible to set a user setting in which the application order is changed in accordance with what a user desires to give priority via the user interface as a new rule.

Figure 8:
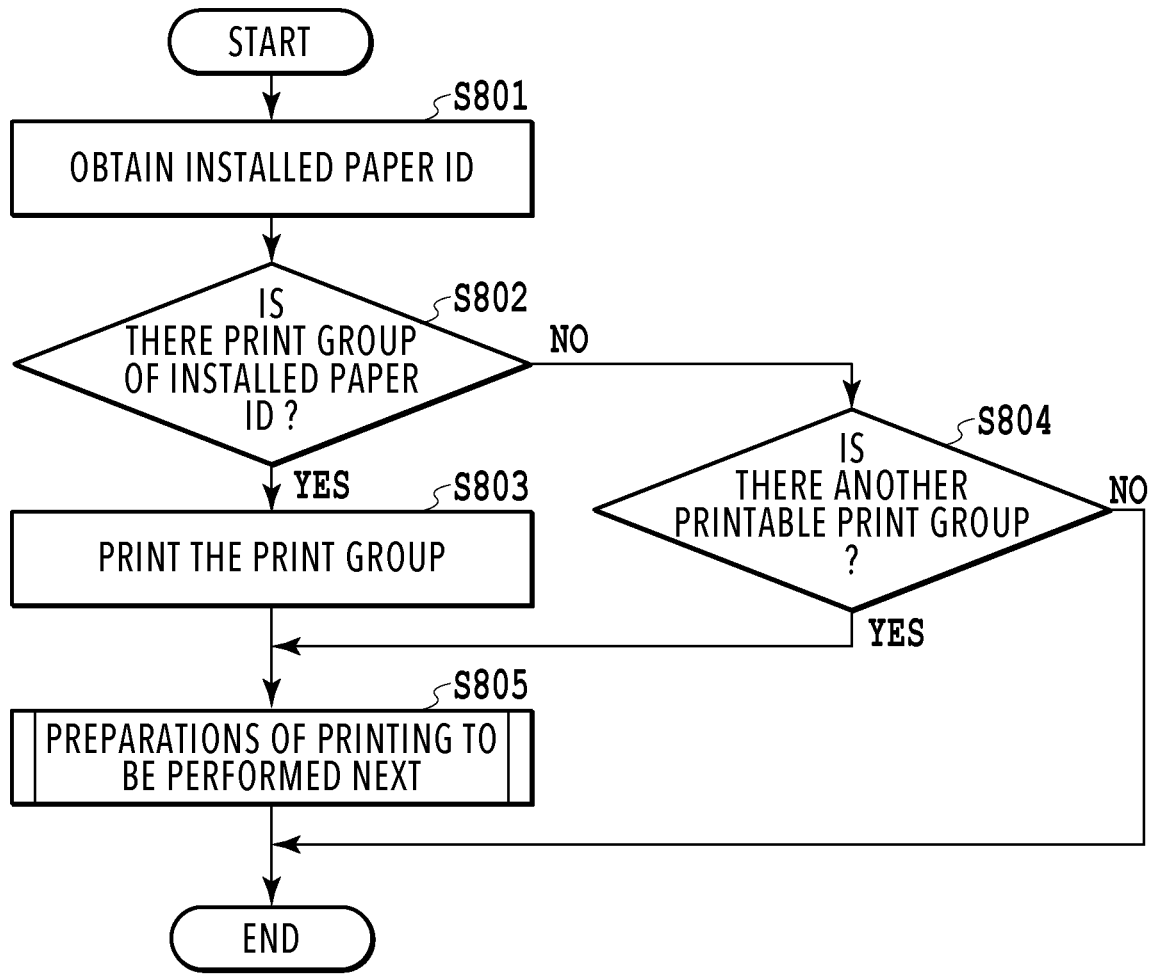
FIG. 8 is a detailed flowchart of printing start processing.

FIG. 8 is a detailed flowchart of the printing start processing (S608) in FIG. 6A. Here, with reference to the job list 609 and the print group list 619 in FIG. 6D and the rule setting 711 in FIG. 7E, the printing start processing is explained specifically. In a case where there is a plurality of rule settings, though the application rule setting is selected in advance, it is assumed that the rule setting 711 is selected here. In a case where another rule setting is selected, the information obtained from the print group list 619 and the results selected as the job that is located at the first position (in the following, referred to as "highest-priority job") at S912, to be described later, may change. The print job determination unit 305 reads the rule setting 711 shown in FIG. 7E and starts processing.

First, at S801, the print job determination unit 305 obtains Installed Paper ID 502 from the apparatus information 506 in FIG. 5B. Here, Paper ID "1" is obtained.

Next, at S802, the print job determination unit 305 searches the print group list 619 in FIG. 6D to determine whether a print group using obtained paper ID exists in order to apply the rule 712 whose Application order is "1" in the rule setting 711 in FIG. 7E. In the print group list 619 in FIG. 6D, two print groups, that is, "PG-1" of the print group 610 and "PG-2" of the print group 611 exist. The print group 610 is the print group using paper ID "1", and therefore, the print job determination unit 305 determines that the relevant print group exists (YES at S802).

Next, at S803, the print job determination unit 305 starts printing by taking the print group 610 as the first priority job.

Next, at S805, the print job determination unit 305 performs the preparation processing of printing to be performed next in order to determine the second priority job. The preparation processing of printing to be performed next will be described later with reference to FIG. 9.

On the other hand, in a case where the print group using Paper ID "1" does not exist (NO at S802), at S804, the print job determination unit 305 searches whether there is another print group whose Processing state 618 is "RIP completed" in the print group list 619. In a case where such another print group exists (YES at S804), it is made possible to perform printing by exchanging the installed papers, and therefore, the print job determination unit 305 performs the preparation processing of printing to be performed next in order to determine the first priority job after roll paper exchange. In a case where such another print group does not exist (NO at S804), the job for which printing is possible does not exist, and therefore, the printing start processing is terminated.

Figure 9:
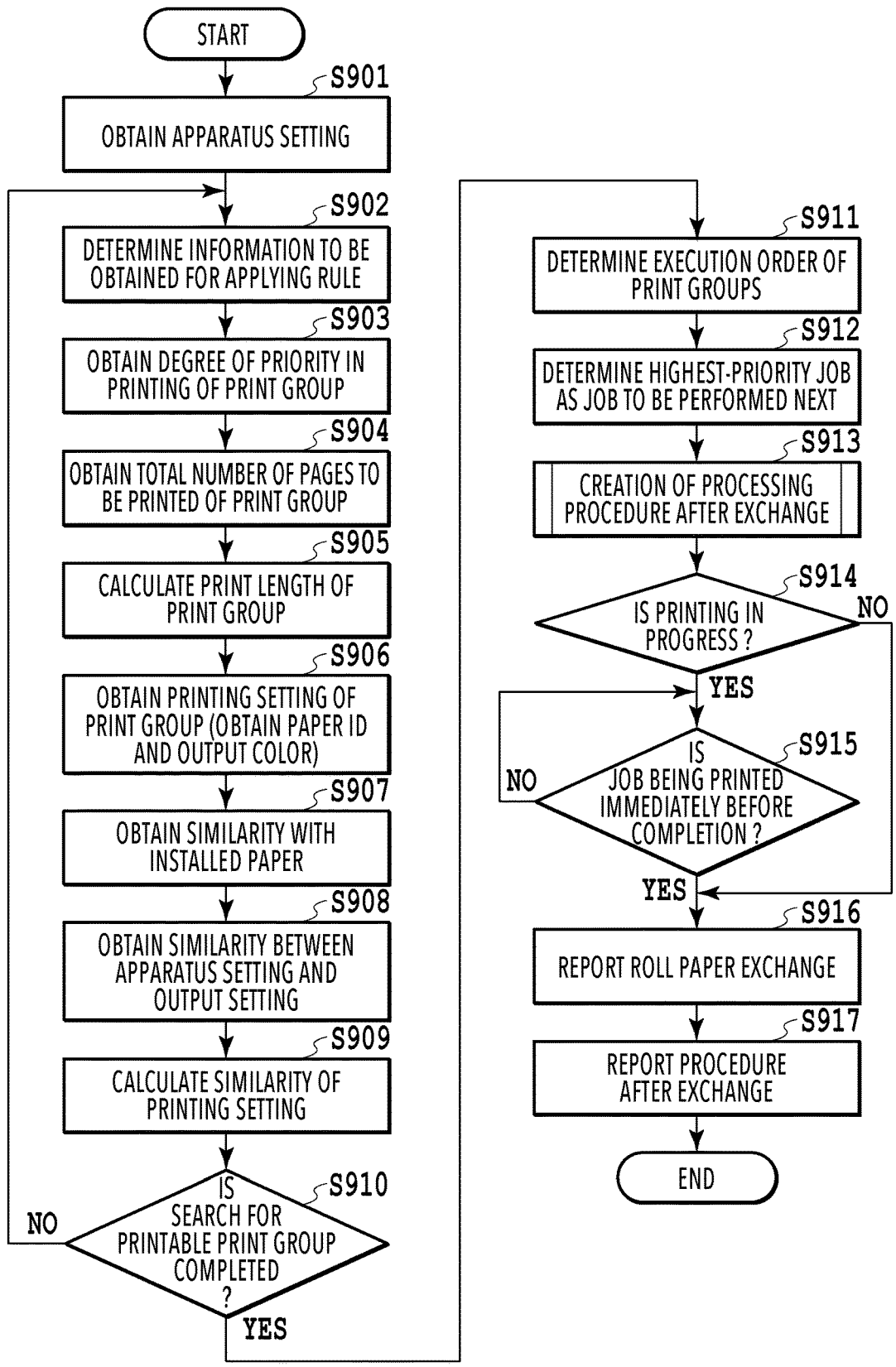
FIG. 9 is a detailed flowchart of preparation processing of printing to be performed next.

FIG. 9 is a detailed flowchart of the preparation processing of printing to be performed next (S805) in FIG. 8. Here also, as in FIG. 8, specific explanation is given with reference to the job list 609 and the print group list 619 in FIG. 6D and the rule setting 711 in FIG. 7E. Here, explanation is given on the assumption that the second priority job (or the first priority job after roll paper exchange) is determined based on the rule setting 711 in FIG. 7E. Information necessary for applying the rule setting 711 is obtained from the apparatus information 506 and the print group list 619.

First, at S901, the print job determination unit 305 obtains information (here, Ink color 507) other than Installed Paper ID 502 from the apparatus information 506.

Next, at S902, the print job determination unit 305 determines information that is obtained from the print group list 619 in order to apply the rule setting.

Here, though the rule setting 711 is used, the rule 712 is already applied, and therefore, information necessary for applying the other roles 713, 714, and 715 is determined. As Sub-rule 704, "Sub-2" is set, and therefore, the rule 713 utilizes paper ID in order to refer to the similarity between paper types list 706. Further, in the present embodiment, the print length of the rule 714 is calculated by adding the margin between pages, which is a fixed length, to the total number of pages of each job, and therefore, the total number of pages of each job is obtained. As the degree of priority in printing of the rule 715, the degree of priority referring to the degree of priority in printing is obtained. That is, Paper ID 616 for applying the rule 713, Total number of pages 614 for applying the rule 714, and Degree of priority 617 for applying the rule 715 are respectively determined as the target that is obtained from the print group list 619. Further, in order to determine the influence of the hue irrespective of the rule setting, Output color 615 is also taken as the obtaining target.

At next S903 to S909, the print job determination unit 305 obtains the information determined at S902 from the print group list 619. Though it is possible to obtain the information determined at S902 in any order, in the following, explanation is given on the assumption that the information is obtained in the order from the information whose rule application order is the last.

First, at S903, the print job determination unit 305 obtains Degree of priority 617 from the print group list 619. For example, in a case of the print group 611 in FIG. 6D, "3" is obtained as Degree of priority 617.

Next, at S904, the print job determination unit 305 obtains Total number of pages 614 of the print group from the print group list 619 and at S905, calculates the print length. It may be possible to calculate the print length by adding the margin between pages, which is a fixed length, to the total number of pages of the print group.

Next, at S906, the print job determination unit 305 obtains Output color 615 and Paper ID 616 from the print group list 619 as the printing setting.

Next, at S907, the print job determination unit 305 obtains the similarity with the installed paper from the similarity between paper types list 706 by utilizing the apparatus information obtained at S901 and Paper ID 616 obtained at S906.

Next, at S908, the print job determination unit 305 calculates the similarity between the apparatus setting and the output setting. In the present embodiment, Output color 615 is used as the output setting. In the apparatus information 506, as Ink color 507, CMYKW is registered. In the print group list 619, as Output color 615, to the print group 610, CMYK is set and to the print group 611, CMYKW is set. Consequently, Output color 615 (that is, output setting) of the print group list 619 is contained in Ink color 507 of the apparatus information 506. Because of this, a value, for example, 1 is set, whose output setting does not affect the similarity calculation processing at S909, to be described later. In the present embodiment, in order to further reduce the printing preparation time after the second priority job is determined, not only the similarity between paper types by the rule 713 but also the similarity between output colors is utilized.

Next, at S909, the print job determination unit 305 calculates the similarity in the printing setting of each print group by utilizing the similarity obtained at S907 and S908. In the present embodiment, the rule setting 711 is used, and therefore, the similarity is obtained at S907 to S909. In a case where the rule setting 707 is used, the similarity is not used, and therefore, the similarity calculation processing at S907 to S909 is not necessary. Among the print groups of the print group list 619, for all the print groups whose Processing state 618 is "RIP completed" and which are printable, the information at S903 to S908 is obtained.

After the obtaining of the information on all the printable print groups is completed (YES at S910), at S911, the print job determination unit 305 determines the execution order of the print groups by referring to the rule setting 711. Here, the execution order of the print groups is determined so that the print group whose degree of priority in execution is higher is set as a higher-priority job. More specifically, first, the rule 713 is applied, and therefore, the print group whose degree of similarity is the highest is set as the highest-priority job. For the print groups whose degree of similarity that is referred to by the rule 713 is the same, by further applying the next rule 714 and the order is determined. Until the order is determined, the rule setting 711 is applied sequentially in accordance with the application order. For the rule 714, it may also be possible to increase the degree of priority in execution of the print group whose print length is long, and for the rule 715, it may also be possible to increase the degree of priority in execution of the print group whose value of the degree of priority in printing is great.

By S911, the highest-priority print group is determined, and therefore, at S912, the print job determination unit 305 determines the print group set as the highest-priority print group in the processing order to be the job to be performed next. Here, the first priority job is already determined and for which printing is in progress, and therefore, the highest-priority print group at S911 is determined to be the second priority job.

Next, at S913, the print job determination unit 305 creates a printing preparation procedure that is performed after roll paper exchange because roll paper exchange or the like is necessary in order to print the job determined at S912. The creation processing of the printing preparation procedure after roll paper exchange will be explained in detail with reference to FIG. 10A and FIG. 10B, to be described later.

Next, at S914, the print job determination unit 305 obtains the printing state from the printing situation management unit 306 and determines whether printing is in progress in order to determine the reporting timing of the procedure necessary in a case where the job to be performed next is performed.

In a case where printing is in progress (YES at S914), the print job determination unit 305 stands by until the time immediately before the completion of printing of the print group being printed is reached (NO at S915). In the present embodiment, whether the time is immediately before the completion of printing is determined by determining whether the number of remaining pages of the print group is less than or equal to a threshold value. Here, in a case where the number of remaining pages of Total number of pages 614 of the print group being printed becomes 10% or less, it is determined that the time is immediately before the completion of printing. It may also be possible for a user to set the threshold value via the user interface 309, or it may also be possible to set in advance for each paper type. Alternatively, it may also be possible to determine the time immediately before the completion of printing based on the time elapsed from the start of printing.

In a case where printing is not in progress (NO at S914), or in a case where the time immediately before the completion of printing is reached (YES at S915), first, at S916, the print job determination unit 305 reports roll paper exchange by the reporting unit 307. After that, at S917, the print job determination unit 305 reports the procedure created at S913 by the reporting unit 307.

Next, the creation processing of the printing preparation procedure after roll paper exchange (S913) is explained with reference to FIG. 10A and FIG. 10B.

Figure 10A:
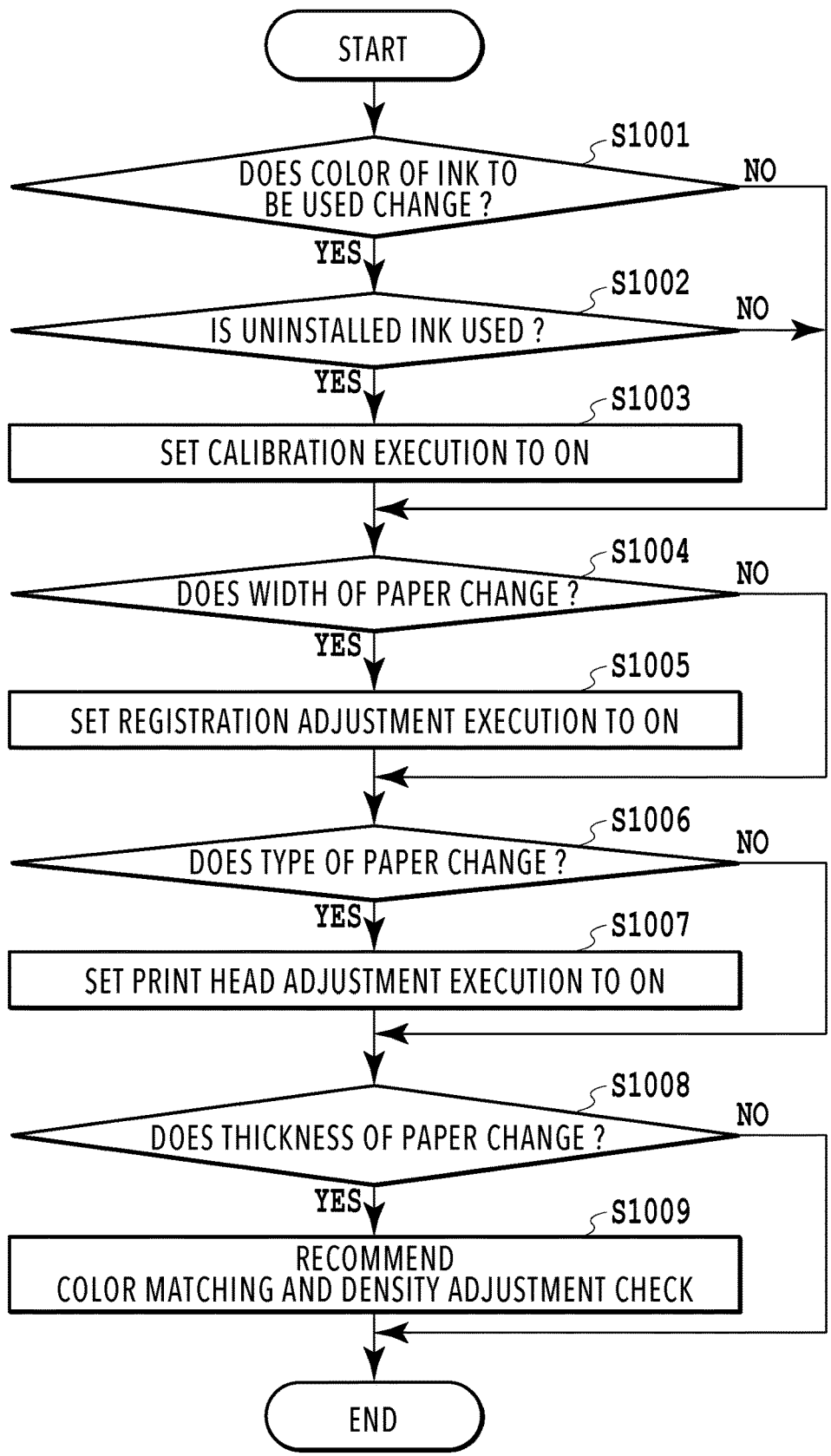
FIG. 10A is a flowchart of creation processing of a printing preparation procedure after roll paper exchange.

FIG. 10A is a flowchart showing one example of the creation processing of the printing preparation procedure after roll paper exchange and (a) in FIG. 10B shows a print group list before the creation processing of the printing preparation procedure (after S912). In the present embodiment, for the creation processing of the printing preparation procedure, the apparatus information 506 and a print group list 1010 are used. It is assumed that in the current apparatus setting, Paper ID is "1" and ink of "CMYKW" is installed as can be seen from the apparatus information 506. Further, the print group list 1010 shows the state where the first print group "PG-1" is being printed and the next print group "PG-2" is set.

First, at S1001, the print job determination unit 305 determines whether the color of the ink to be used changes. In a case where Output color 1011 of "PG-1" is compared with that of "PG-2" in the print group list 1010, "PG-1" is "CMYK" and "PG-2" is "CMYKW", and therefore, it is determined that the color of the ink to be used changes (YES at S1001). Next, at S1002, the print job determination unit 305 determines whether uninstalled ink is used. Here, from the apparatus information 506, "CMYKW" is already installed and Output color 1011 of "PG-2" is "CMYKW", and therefore, the print job determination unit 305 determines that uninstalled ink is not used (that is, installed ink is used) (NO at S1002). Consequently, installed ink is used, and therefore, calibration is set to OFF. On the other hand, in a case where uninstalled ink is used (that is, ink color not included in the apparatus information 506 is used) (YES at S1002), inks are exchanged, and therefore, the execution of calibration is set to ON. In a case where it is determined that the color of the ink to be used does not change (NO at S1001), it is not necessary to perform the processing at S1002 and S1003.

Next, at S1004, the print job determination unit 305 determines whether the width of paper changes. Here, by utilizing Paper ID 1012 of the print group list 1010, the width of paper is obtained from the paper management list 501. The width of paper of the print group "PG-1" is "330" and the width of paper of the print group "PG-2" is "310", and therefore, it is determined that the width of paper changes (YES at S1004). Because of this, at S1005, registration adjustment execution is set to ON. In a case where it is determined that the width of paper does not change (NO at S1004), it is not necessary to perform S1005.

Next, at S1006, the print job determination unit 305 determines whether the type of paper changes. The type of paper is also obtained from the paper management list 501 as in the case of the width of paper. The type of paper of the print group "PG-1" is "high-quality paper (1)" and the type of paper of the print group "PG-2" is "glossy paper (2)", and therefore, it is determined that the type of paper changes (YES at S1006). Because of this, at S1007, print head adjustment execution is set to ON. In a case where it is determined that the type of paper does not change (NO at S1006), it is not necessary to perform S1007.

Next, at S1008, the print job determination unit 305 determines whether the thickness of paper changes. The thickness of paper is also obtained from the paper management list 501 as in the case of the width of paper and the type of paper. The thickness of paper of the print group "PG-1" is "0.3" and the thickness of paper of the print group "PG-2" is "0.5", and therefore, it is determined that the thickness of paper changes (YES at S1008). Consequently, at S1009, setting is performed so that it is recommended to perform color matching and density adjustment check and the processing is terminated. In a case where it is determined that the thickness of paper does not change (NO at S1008), it is not necessary to perform S1009.

FIG. 10B (b) shows a printing preparation procedure list 1013 that is generated after the creation processing of the printing preparation procedure after roll paper exchange is completed. The printing preparation procedure list 1013 is reported at S917 as the printing preparation procedure that is performed after roll paper exchange.

As above, by determining the first priority job and the second priority job based on the rule, it is made possible to suppress roll paper exchange and reduce the printing preparation time after exchange, and therefore, it is possible to make an attempt to improve productivity.

Second Embodiment

A printing apparatus that performs printing for a printing medium in the form of a roll stands by until print data is prepared sufficiently in order to perform continuous printing as long as possible by connecting a plurality of jobs and in order to prevent wasted paper, such as blank paper, due to missing of print data. Note that in a case where the printing apparatus stands by until a sufficient print length is obtained, the start of printing is delayed, and therefore, productivity is reduced. On the other hand, in a case where a print group is settled prematurely in order to start printing at timing at which print data is prepared, on a condition that a job that can belong to the same print group is input after printing is started, the job is determined to belong to another print group, and therefore, productivity is reduced. Consequently, in the present embodiment, the settlement of a print group is postponed and in a case where a job has the same job setting as that of the print group being printed (that is, a job that can belong to the same print group), the job is added to the print group being printed and continuous printing is enabled.

The function configuration of the printing apparatus in the present embodiment is the same as the configuration shown in FIG. 3.

Figure 11:
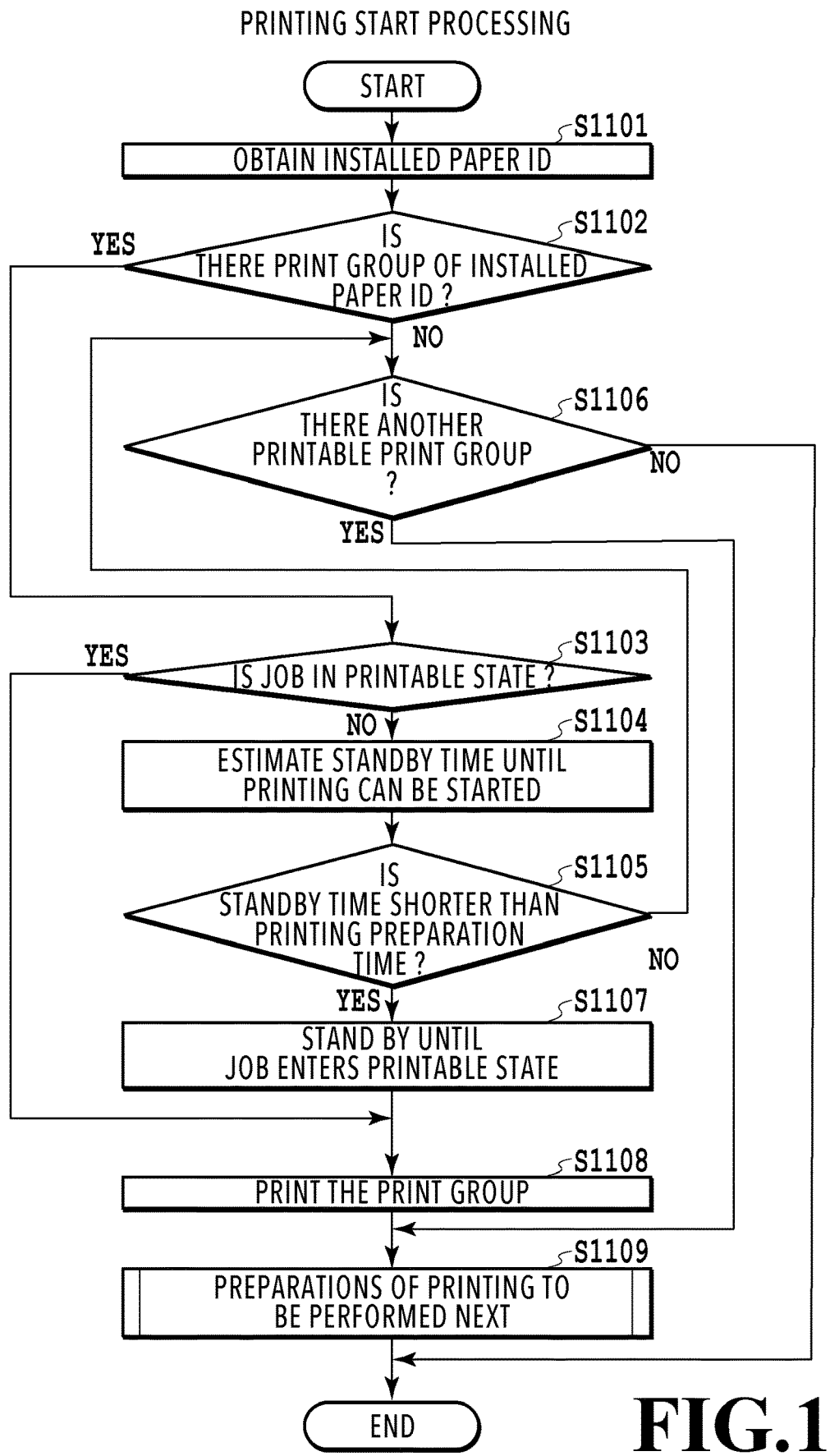
FIG. 11 is a detailed flowchart of printing start processing.

FIG. 11 is a detailed flowchart of printing start processing in the present embodiment. Explanation of the same processing as the printing start processing explained with reference to FIG. 8 is omitted. Here, a case is explained where a print group whose installed paper ID is the same exists at S1102 (YES at S1102).

First, at S1103, the print job determination unit 305 determines whether the state of a job newly input is the printable state. In the present embodiment, the print job determination unit 305 determines whether Processing state 407 in the job list 401 is "RIP completed". In a case of "RIP completed", the state of the job is determined to be the printable state. In a case where printing is possible (YES at S1103), the print job determination unit 305 adds the newly input job to the print group being printed as it is and performs printing. On the other hand, in a case where printing is not possible (NO at S1103), at S1104, the print job determination unit 305 estimates the standby time until the job enters the printable state. In the present embodiment, it may also be possible to estimate the standby time by performing rough calculation with the data size and the number of pages. Alternatively, it may also be possible to estimate the standby time by accumulating in advance job information and the processing time of each job and extracting similar data from the accumulated data group.

Next, at S1105, the print job determination unit 305 determines whether the estimated standby time is shorter than the printing preparation time in a case where roll paper exchange is performed. The printing preparation time is taken to be the execution time in a case where all the procedures to be performed after roll paper exchange, such as the calibration described above, are performed. The execution time of the procedure to be performed after roll paper exchange is stored in the apparatus setting management unit 304. In a case where the standby time is shorter than the printing preparation time (YES at S1105), at S1107, the print job determination unit 305 stands by until the job enters the printable state and after the job enters the printable state, the print job determination unit 305 adds the job to the print group being printed. On the other hand, in a case where the standby time is not shorter than the printing preparation time (NO at S1105), the print job determination unit 305 does not add the job to the print group being printed because the printing efficiency on the whole is higher in a case where the job is caused to enter the printable state while another print group is processed.

As described above, according to the present embodiment, it is possible to increase the print length of the first priority job by suppressing unnecessary roll paper exchange, and therefore, it is made possible to enable continuous printing without reducing productivity on the whole.

OTHER EMBODIMENTS

In the above-described embodiments, even in a case where the paper that is used in the job is the same, on a condition that the output color is different, the job is regarded as belonging to another print group. Note that in a case where the printing preparation processing, such as calibration, is not necessary, or in a case where the printing processing is not affected, it may also be possible to cause the job to belong to the same print group. Further, in the present embodiment, though the ink color and paper information are utilized in a case where the printing preparation procedure after roll paper exchange is determined, it may also be possible to take into consideration information, such as a change over time. Furthermore, though the printing preparation time is referred to for the determination of the addition to the first priority job, it may also be possible to use the time until the printing of the print group being printed is completed or the printing preparation time, whichever is shorter.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible to reduce the printing preparation time taken for printing medium exchange and improve productivity in a printing apparatus performing printing for a printing medium in the form of a roll.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-202227, filed Dec. 19, 2022, which is hereby incorporated by reference herein in its entirety.

What is claimed is:

1. A printing apparatus performing printing for a printing medium in the form of a roll, the printing apparatus comprising:
   a determination unit having a processor for executing instructions to determine a printing-target print job; and
   a controller for controlling printing for the printing medium in accordance with the print job, wherein
   the determination unit further executes instructions to:
      determine a print job using an installed printing medium as a first priority job;
      determine, during printing of the first priority job, a second priority job to be printed with priority after the first priority job among print jobs not using the installed printing medium;
   add, in a case where a print job that can belong to the same print group as that of the first priority job is input newly during printing of the first priority job and the newly input print job is in a printable state, the newly input print job to the same print group as that of the first priority job; and
   stand by, in a case where the newly input print job is not in a printable state and a standby time until the newly input print job enters a printable state is shorter than a printing preparation time taken for exchange of the installed printing medium, until the newly input print job enters a printable state and adds the newly input print job to the same print group as that of the first priority job.

2. The printing apparatus according to claim 1, wherein the first priority job is processed as a print group including a plurality of print jobs.

3. The printing apparatus according to claim 2, wherein the plurality of print jobs uses the same printing medium and whose output setting is the same.

4. The printing apparatus according to claim 1, wherein the determination unit further executes instructions to determine an execution order of the print jobs not using the installed printing medium based on rule setting set in advance and determines the highest-priority print job as the second priority job.

5. The printing apparatus according to claim 1, wherein the determination unit further executes instructions to determine the second priority job in accordance with similarity between the installed printing medium and a printing medium to be used for a print job not using the installed printing medium.

6. The printing apparatus according to claim 5, wherein the similarity is determined by a value assigned to a combination of types of the printing medium.

7. The printing apparatus according to claim 1, wherein the determination unit further executes instructions to determine the second priority job in accordance with a print length of a print job not using the installed printing medium.

8. The printing apparatus according to claim 1, wherein the determination unit further executes instructions to determine the second priority job in accordance with a degree of priority in printing of a print job not using the installed printing medium.

9. The printing apparatus according to claim 1, wherein the determination unit further executes instructions to determine the second priority job in accordance with a rule by user setting.

10. The printing apparatus according to claim 1, further comprising:
a reporting unit having a processor for executing instructions to report to a user, wherein
the reporting unit reports a printing preparation procedure created to perform the second priority job based on determination of the second priority job.

11. A control method of a printing apparatus performing printing for a printing medium in the form of a roll, the control method comprising:
determining a printing-target print job; and
controlling printing for the printing medium in accordance with the print job, wherein in the determining:
a print job using an installed printing medium is determined as a first priority job; and
during printing of the first priority job, a second priority job to be printed with priority after the first priority job among print jobs not using the installed printing medium is determined;
adding, in a case where a print job that can belong to the same print group as that of the first priority job is input newly during printing of the first priority job and the newly input print job is in a printable state, the newly input print job to the same print group as that of the first priority job; and
standing by, in a case where the newly input print job is not in a printable state and a standby time until the newly input print job enters a printable state is shorter than a printing preparation time taken for exchange of the installed printing medium, until the newly input print job enters a printable state and adds the newly input print job to the same print group as that of the first priority job.

12. A non-transitory computer readable storage medium storing a program which causes a computer to perform a control method of a printing apparatus performing printing for a printing medium in the form of a roll, the control method comprising:
determining a printing-target print job; and
controlling printing for the printing medium in accordance with the print job, wherein in the determining:
a print job using an installed printing medium is determined as a first priority job; and
during printing of the first priority job, a second priority job to be printed with priority after the first priority job among print jobs not using the installed printing medium is determined;
adding, in a case where a print job that can belong to the same print group as that of the first priority job is input newly during printing of the first priority job and the newly input print job is in a printable state, the newly input print job to the same print group as that of the first priority job; and
standing by, in a case where the newly input print job is not in a printable state and a standby time until the newly input print job enters a printable state is shorter than a printing preparation time taken for exchange of the installed printing medium, until the newly input print job enters a printable state and adds the newly input print job to the same print group as that of the first priority job.

* * * * *